(12) United States Patent
Gunderson (10) Patent No.: US 6,883,821 B2
(45) Date of Patent: Apr. 26, 2005

(54) CONTROLLED-ARTICULATION TRAILER WITH SYNCHRONIZED STEERING AND A TRAVELLING TOP LINK TOOL BAR HITCH

(76) Inventor: Gene Gunderson, R.R. 3 Box 112, LaCrescent, MN (US) 55947

( * ) Notice: Subject to any disclaimer, the term of this patent is extended or adjusted under 35 U.S.C. 154(b) by 0 days.

(21) Appl. No.: 10/242,986
(22) Filed: Sep. 12, 2002

(65) Prior Publication Data

US 2003/0067140 A1 Apr. 10, 2003

Related U.S. Application Data

(60) Provisional application No. 60/322,517, filed on Sep. 12, 2001.

(51) Int. Cl.$^7$ .............................................. B62D 13/00
(52) U.S. Cl. ...................................... 280/442; 172/439
(58) Field of Search ............................... 280/442, 443, 280/444, 463, 462, 450; 172/439, 440, 442

(56) References Cited

U.S. PATENT DOCUMENTS

| | | | | |
|---|---|---|---|---|
| 3,430,975 A | * | 3/1969 | Wolf ........................... | 280/103 |
| 4,365,841 A | * | 12/1982 | McLaughlin ................. | 298/27 |
| 4,662,646 A | * | 5/1987 | Schlapman et al. ......... | 280/462 |
| 4,768,803 A | * | 9/1988 | Hewitt et al. ................ | 280/462 |
| 5,360,223 A | * | 11/1994 | Kuhns ...................... | 280/137.5 |
| 5,531,468 A | * | 7/1996 | White ......................... | 280/463 |
| 6,148,927 A | * | 11/2000 | Hoffart ....................... | 172/439 |
| 6,176,504 B1 | * | 1/2001 | Van Mill et al. ............ | 280/444 |
| 6,193,259 B1 | * | 2/2001 | Rupard ....................... | 280/508 |
| 6,273,449 B1 | * | 8/2001 | Harkcom et al. ........ | 280/491.3 |
| 6,655,468 B1 | * | 12/2003 | Casali et al. ................ | 172/439 |

* cited by examiner

Primary Examiner—Lesley D. Morris
Assistant Examiner—Tony Winner
(74) Attorney, Agent, or Firm—Inskeep Intellectual Property Group, Inc.

(57) ABSTRACT

A controlled articulation trailer with synchronized steering and a traveling top link three point tool bar hitch is disclosed. The controlled articulation trailer comprises a box-frame carriage having two separate but laterally aligned, wheeled axles near the back of the carriage. The aligned axles are mechanically angularly controlled by, or 'synchronized to', the movements of the draft vehicle. A tongue attaches to the draft vehicle via a hitch plate bolted to the draw bar of the draft vehicle. The tongue receiver fits onto a ball hitch and an adjustable stabilizer arm is bolted to the hitch plate and extends at an angle back to a tongue attachment. The tongue connects through the front of the carriage to a pivot point located on a bridge across the front-middle of the carriage and extends beyond this pivot point to connect, through doubly-pivoting tie-rods, to the wheels, thus controlling the articulation such that the trailer's wheels turn in synchronization to turns made by the draft vehicle. A hydraulic ram-bolt and V-mount system is located near the front of the carriage such that the ram-bolt, riding along the tongue, may be moved in and out of the V-mount thereby allowing the manual override of the synchronization which further controls the degree of articulation and to some extent allows the operator to further control the position of the trailer relative to the draft vehicle. A weight-bearing front axle may be pivotally mounted near the front of the carriage to help reduce tongue weight on the tongue. A three point tool bar hitch system is mounted near the back of the carriage above the back wheels, the top link of which may be hydraulically or otherwise moved along a rail which is rigidly-mounted to the frame so to enable the operator to 'pull' or 'push' the fulcrum of the lifting three point hitch as desired.

14 Claims, 6 Drawing Sheets

DRAFT VEHICLE

CONTROLLED-ARTICULATION TRAILER WITH SYNCHRONIZED STEERING AND A TRAVELLING TOP LINK TOOL BAR HITCH

REFERENCE TO RELATED APPLICATIONS

This application claims the benefit of priority of U.S. Provisional Application No. 60/322,517, filed Sep. 12, 2001.

FIELD OF THE INVENTION

The present invention relates to an agricultural implement-carrying trailer with a mounted three point tool bar hitch assembly and more particularly to an articulating trailer with synchronized steering and a traveling top link hitch, capable of lifting an implement from, or holding an implement in, a field-use position.

BACKGROUND OF THE INVENTION

The use of small-scale work vehicles—vehicles such as animal-drawn forecarts, all terrain vehicles ("ATVs") and small-scale tractors—is greatly increasing. Generally however, these smaller work vehicles cannot accomplish the things that a large-scale farm tractor can, at least not with the same degree of speed or quality. Because of economics and otherwise, there is a desire for a tool which would allow these smaller work vehicles to do much of what larger-scale vehicles can.

Three point hitches are used by a variety of work vehicles—such as animal-drawn forecarts, ATVs, and wheeled or tracked large and small-scale tractors—to attach an implement to the work vehicle and to raise or lower the implement relative to the work vehicle to and from a field-use position. By their nature, three point hitches provide such a work vehicle with increased flexibility to perform a number of tasks which otherwise would require a variety of more specialized single function vehicles.

Three point hitches generally are comprised of two spaced lower links and a top link above and between the two lower links. Each of the top link and lower links has an end configured for engaging and attaching the implement to the work vehicle. To lift the implement, the three point hitch generally includes one or more hydraulic cylinders, which directly or indirectly pivot the lower links to lower and raise the implement. As the implement is raised and lowered, the top link typically stabilizes the implement and maintains the implement in a desired orientation relative to the work vehicle.

Three point hitches are generally either rear/front mounted directly onto the work vehicle, or rear mounted on an attached trailer. There are drawbacks with either of these methods which generally force smaller work vehicles to hitch to and manipulate smaller, and typically much less useful and/or efficient, implements.

A hitch which is directly attached to the work vehicle, either in front or in back, presents several disadvantages. Such an attached hitch (i) increases the length of the work vehicle thereby decreasing mobility and sight-lines and (ii) imposes a directly opposing force on the work vehicle thereby limiting the scale and weight which can be carried in the hitched implement. Additionally, front-mounted direct hitches move the implement laterally as the work vehicle is being turned—an undesirable effect especially when the hitched implement is engaged in the ground.

When pulled by a relatively smaller draft vehicle, trailer-attached hitches are generally relegated to carrying relatively smaller implements. Obviously, the scale of the trailer must reduce in accordance with the scale of the draft vehicle. Generally however, as the trailer becomes smaller and lighter, the weight of the hitched implement and corresponding load typically reduces at an even faster rate for a number of reasons. With the design of the typical three point hitch, the top link either remains stationary relative to the two lower links or moves in conjunction with the two lower links. Either way, the fulcrum of the load remains fixed back of the trailer's axle, thereby limiting the allowable weight of the implement. A heavier implement puts more direct downward force on the back of the trailer, thereby forcing the tongue of the trailer up and comprising the coupling with the work vehicle. Additionally, the movement of a typical three point hitch limits the consistency of position with which the operator can return the attached implement. Moreover, typical three point hitch trailers, like any standard-steering trailer, have a tendency to jackknife (i.e. the point of attachment between the trailer and the draft vehicle becomes an uncontrolled articulation) and are exceedingly unstable, especially on varied terrain—a tendency which grows (along with the severity-of-result) with the weight of the hitched implement and corresponding load. The tongue, which connects the trailer to the draft vehicle, needs to be long enough to avoid interference between the two when turning.

Synchronizing the steering (the inapposite angular movement of the trailer axle relative to that of the draft vehicle) and controlling the articulation (by moving the pivot point from the typical point of attachment at the tongue to the recessed mid-carriage pivot point and allowing the nature of synchronization to mechanically control the degree of articulation) of the trailer helps address the stability of the vehicle combination especially over varied terrain. Synchronizing the steering also permit's the tongue to be shortened; thereby increasing the mobility of the vehicle combination.

The uncontrolled articulation of the typical vehicle combination can present problems. As anyone who has tried can attest, backing up a trailing vehicle or vehicle combination is very hard. There is an increased tendency to jackknife and it is difficult to maneuver the vehicle combination to the desired location.

Therefore, there is a growing desire for an articulating trailer whereby the articulation is controlled via the synchronized steering of the trailer wheels and contains a hitch that may pull the fulcrum toward the trailer's weight bearing axles(s) when handling implements. Without limitation, an immediate example illustrates. For various reasons, many farmers are switching to the use of large round bales of hay and straw from the more familiar smaller rectangle bales. The former can weigh up to two thousand pounds while the latter typically weighs forty to one hundred pounds. Because of the reasons briefly described above, small-scale work vehicles cannot easily handle the larger round bales—and they certainly cannot do so in varied or wooded terrain. The desired combination of synchronized steering with mechanically-controlled articulation along with a fulcrum-moving hitch system allows smaller work vehicles to safely lift, handle and move heavy implements and loads such as these large round bales, and thus do work, typically done by much heavier work vehicles.

SUMMARY OF THE INVENTION

It is an object of the present invention to allow relatively small work vehicles to lift, handle and move relatively large implements which potentially themselves bear large loads while reducing the stress on the hitch, the trailer and the draft vehicle.

Another object of the invention is to provide increased mobility and stability to work vehicle combinations in rough terrain or hillside work.

The present invention comprises a separate-axle wheeled box-frame trailer equipped with a traveling top-link three point hitch, an attachable dumping flatbed and synchronized steering with the degree of articulation controlled. It comprises a mid-size box frame trailer with a three point hitch mounted on the back above the wheels. A tongue connects from the draft vehicle (it is not allowed to pivot at the draw bar of the draft vehicle) through the front of the box frame to a pivoting bridge across the front-middle of the box frame. The tongue extends beyond this pivot point to connect to the wheels via tie-rods, thus controlling the articulation such that the trailer's wheels turn in synchronization with turns made by the draft vehicle.

To synchronize the steering, the invention mechanically utilizes seven pivot points, a tongue pivot across the frame, dual pivots for each of two tie-rods, and the pivot of each of the two wheels respectively. An angular transfer system controls the radial movement of the trailer's back axles during turning. The trailer wheels turn in response to turns made by the draft vehicle thus allowing for a much more stable trailing action and tighter turns on varied terrain and/or with heavier loads. The trailer and implement load remains in a linear straight line configuration with the draft vehicle. This eliminates dangerous jack knifing at the draft vehicle draw bar.

The articulation may be further controlled by a hydraulic ram-bolt, riding along the tongue in and out of a V-mount rigidly attached to the frame, located near the middle-front of the carriage. This system allows the operator to 'override' the mechanical synchronization to any desired degree, thereby further controlling the articulation of the vehicle combination. The system may be used to 'lock' in and allow any or no degree of synchronization by the trailer. This same system may also be used to center or steer the trailer when backing up.

The invention utilizes a traveling top link for use with a three point tool bar hitch adapted for use with a work vehicle. The fulcrum of the three point hitch can be moved forward or backward relative to the weight bearing wheels by so moving the top link which travels along a frame-mounted rail hydraulically or otherwise; thereby greatly increasing the potential weight of the implement/load. Although standard three point hitch movements can still be made (the three links moving together or the two bottom links moving while the top link stays stationary), moving the top link only allows the operator of the present invention to consistently return the implements to desired previous positions.

Furthermore, a flatbed may be attached across the top of the invention, which can be raised, lowered or dumped by a hydraulic cylinder, hand winch or otherwise.

The synchronized steering design together with the controlled-articulation and the general size, allow for increased stability when trailing a work vehicle and especially when handling heavy loads. The traveling nature of the three point hitch's' top-link allows the trailer to lift and carry heavier loads than those possible under current trailer or attachment designs for use with ATVs, small scale tractors, or animal-drawn carts.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

FIG. 5a is an elevation view of the three point hitch system while carrying a one-bottom plow implement. FIG. 5a illustrates the result of the traveling top link being 'pushed along its rail.

FIG. 5b is an elevation view of the three point hitch system while carrying a one-bottom plow implement. FIG. 5b illustrates the result of the traveling top link being 'pulled' along its rail

DETAILED DESCRIPTION OF THE INVENTION

Various embodiments of the present invention are shown and described. It is to be understood that though these embodiments are shown and described in isolation, various features of each embodiment can be combined with the others to produce a variety of embodiments.

Figure 1:
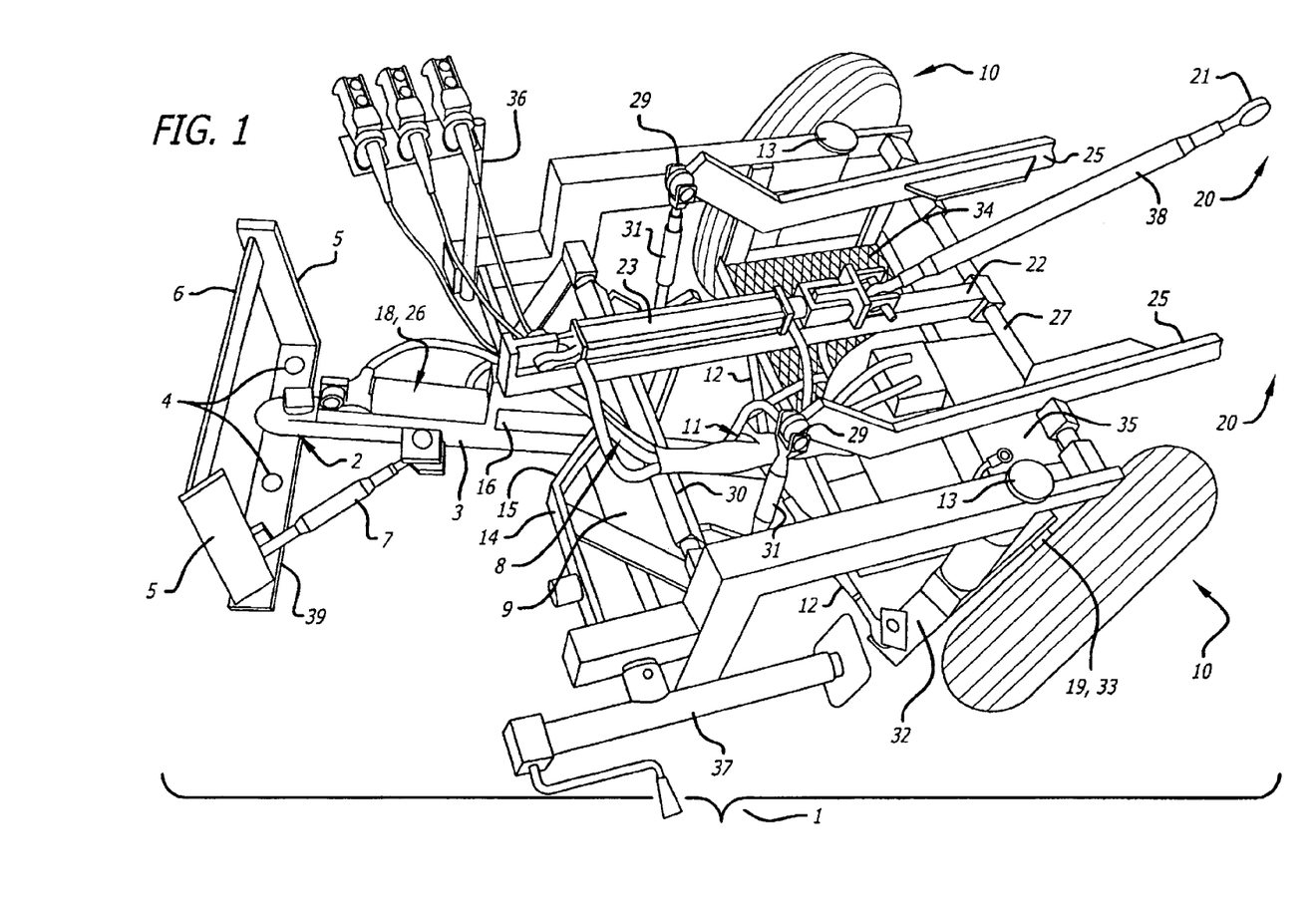
FIG. 1 is a perspective view of the present invention.
Figure 2:
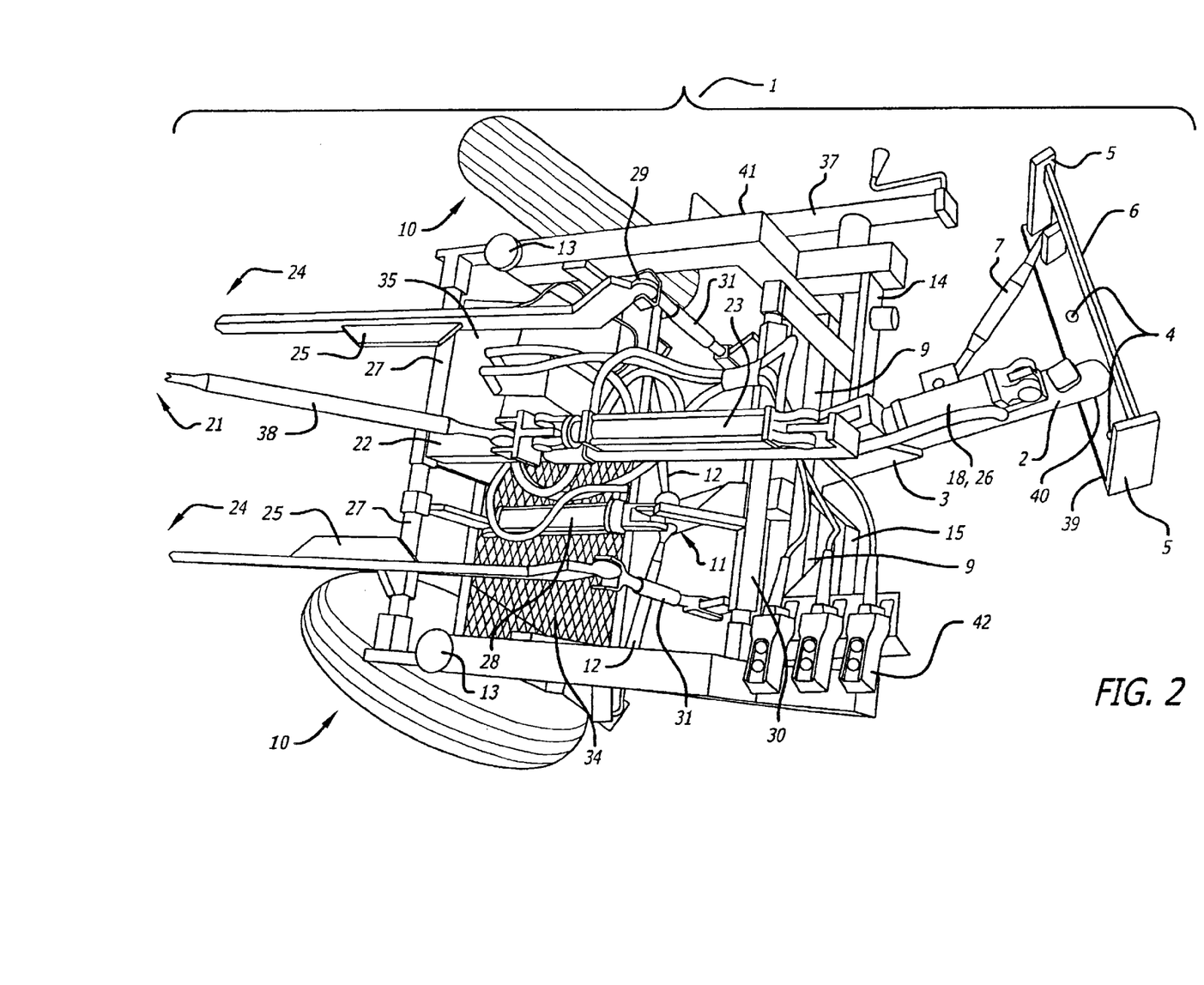
FIG. 2 is a side view of the embodiment of FIG. 1, illustrating a turn in the opposite direction.

The present invention is directed to a separate-axle wheeled box-frame trailer 1 equipped with a traveling top-link three point hitch, an attachable dumping flatbed (not shown) and synchronized steering with the degree of articulation controlled. At the fore of the trailer 1 is a hitch-plate 39 with ball, goose neck or other attachment 2 which is received by a female coupling 40 welded to the tongue 3 of the trailer 1. The hitch plate 39 has holes 4 to match the hole spacing on the draw bar of the draft vehicle. Welded to the plate 39 are risers 5 and a horizontal rail 6 to accommodate saddle weights if additional weight on the tongue 3 is necessary. This hitch plate 39 is bolted securely to the draw bar of the draft vehicle.

Attached to the hitch plate 39 and traveling at an angle, preferably a forty-five degree angle, to the hitch plate 39 is an adjustable stabilizing arm 7. The opposite end of the stabilizing arm 7 attaches to the tongue 3 of the trailer 1. The net affect of the hitch plate 39 is to provide an attachment point between the draft vehicle (an ATV, small tractor, or animal drawn forecart) and the trailer 1. This point of attachment allows both entities to operate at different planes to accommodate ground conditions. However, the stabilizing arm 7 will not permit the trailer tongue 3 to pivot at any angle other than a ninety degree angle (or angle otherwise determined by adjusting the length of the arm—see below) created by the draft vehicle draw bar and the trailer 1—as illustrated by the 'draft vehicle' arrows in FIGS. 3a, 3b and 3c.

The stabilizing arm 7 may be shortened or lengthened in order to modify the angle of the tongue 3 relative to the hitch plate 39 and draw bar of the draft vehicle. This allows the operator to bring the trailer 1 to any position right or left of center alignment—allowing, for instance and without limitation, easier furrow-trailing when plowing.

Figures 3A, 3B:
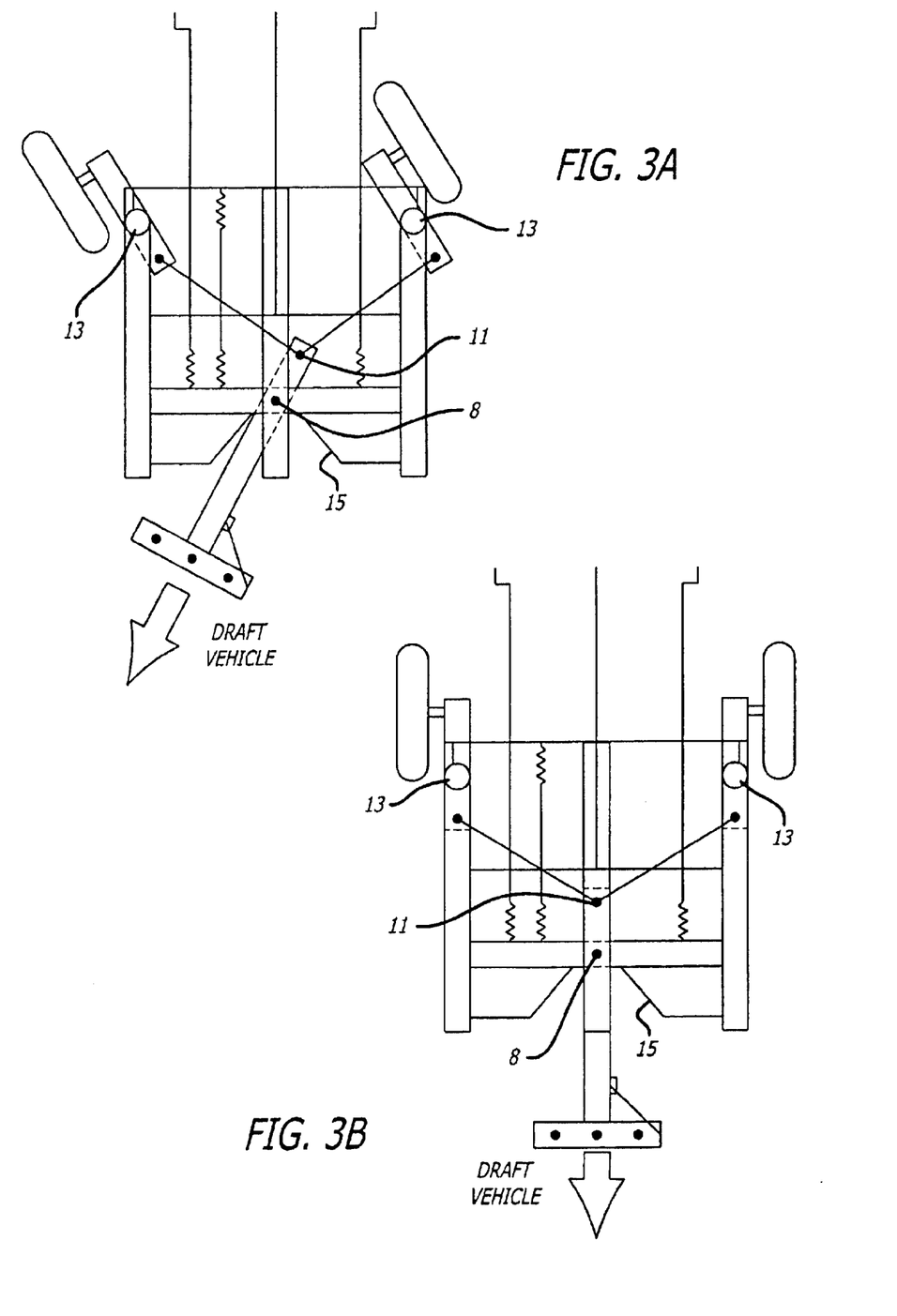
FIG. 3a is a plan view of the present invention showing the articulating and synchronized-steering nature of the invention, wherein a vehicle combination is illustrated with the draft vehicle turned to its right.
FIG. 3b is a plan view showing the articulating and synchronized-steering nature of the invention, wherein a vehicle combination is illustrated where the draft vehicle is continuing in a straight path.
Figure 3C:
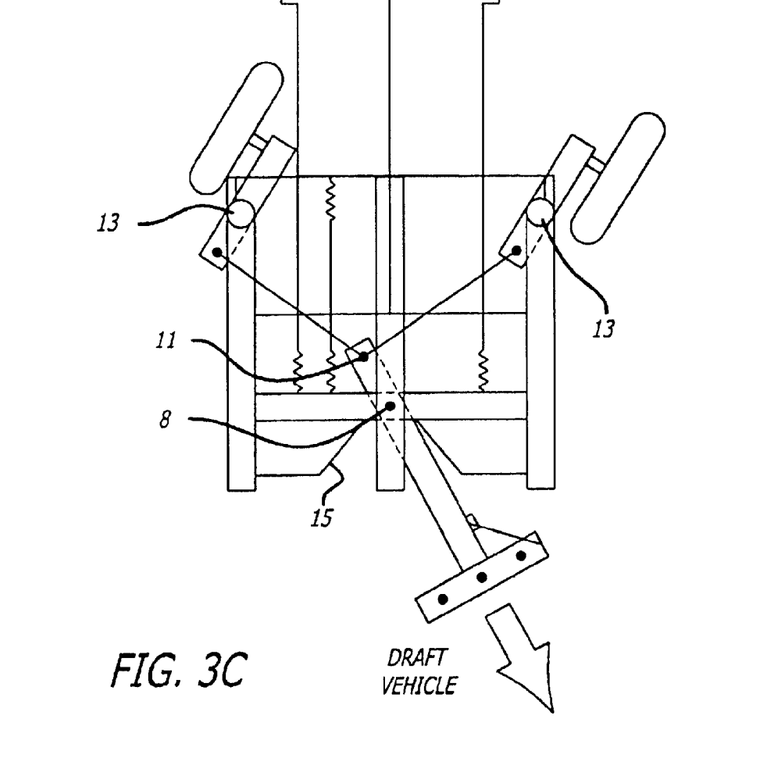
FIG. 3c is a plan view showing a resulting vehicle combination where the draft vehicle has been turned to its left.

Tongue 3 extends back from hitch plate 39 and through the very front of the box frame 41 of the trailer 1. It attaches to the trailer 1 with a pin/coupler 8 mounted on a bridge 9 across the front-middle of the box frame 41. The tongue 3 extends beyond this pivot point 8 to connect to the trailer wheels 10 via couplings 11 to tie rods 12. The tie rods 12 each connect rotationally to a wheel bar 32 which is spindle mounted (spindle mount 13—in preferred but not exclusive embodiment machined to receive a bronze bushing) to the trailer frame 41. The wheels 10 are connected to the back of the wheel bars 32 via their respective axle hub mountings 33. As illustrated in FIGS. 3a and 3c, when the tongue 3 is moved either right or left, the wheels 10 are steered in synchronization with that tongue 3 movement. Since the tongue 3 does not pivot at the draft vehicle draw bar, but rather it pivots at a mid point of the trailer (see 8), the trailer wheels 10 will then steer inapposite with the turning of the draft vehicle. In this manner the inherent articulation between the trailer 1 and the draft vehicle is controlled and the draft vehicle (when allowed per a fully-recessed ram-bolt 16) trails in perfect alignment with the draft vehicle—meaning that there is no cutting of corners by the trailer 1 and, instead, the trailers wheels 10 follow perfectly the path of the draft vehicles wheels (not shown).

When backing up, the trailer 1 responds to turning movements of the draft vehicle as if it were one vehicle. Therefore, it is not necessary to employ a difficult mirror image concept. Also, a significant advantage to controlling the degree of articulation created by the two vehicles is when traveling over rough terrain or when descending a hill and it becomes necessary to turn. With a traditional trailer the point of articulation (typically where the tongue attaches to the draw bar of the draft vehicle—see 2) is not controlled and the danger of jack knifing the vehicle becomes an immediate concern. This danger is compounded if the trailer load is significant and the draft vehicle is comparatively lighter. The trailing load will jack knife and may roll the lighter draft vehicle. This design prevents the creation of a jack knife hazard.

Figure 4A:
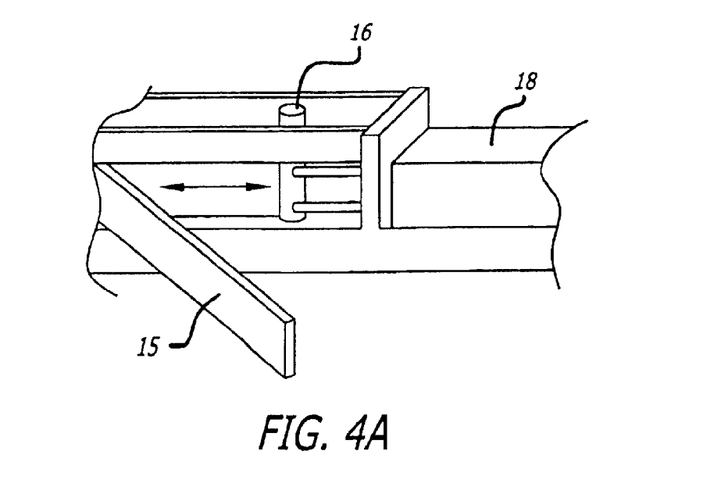
FIG. 4a is a perspective view of the ram-bolt and V-mount system.
Figure 4B:
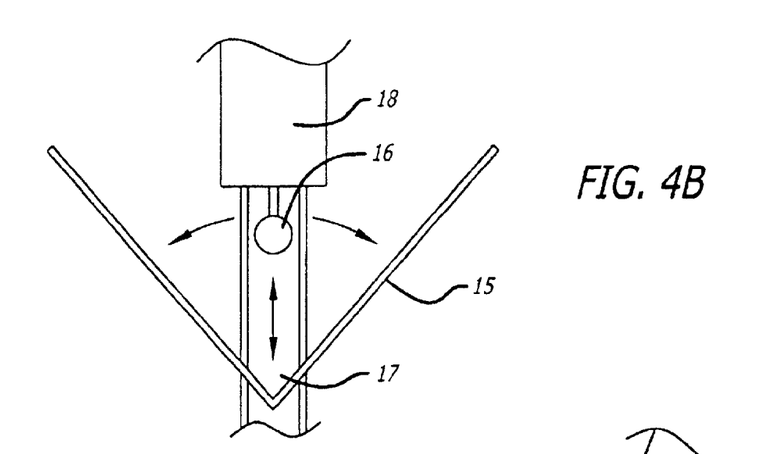
FIG. 4b is a plan view of the ram-bolt and V-mount system with a fully recessed ram-bolt.
Figure 4C:
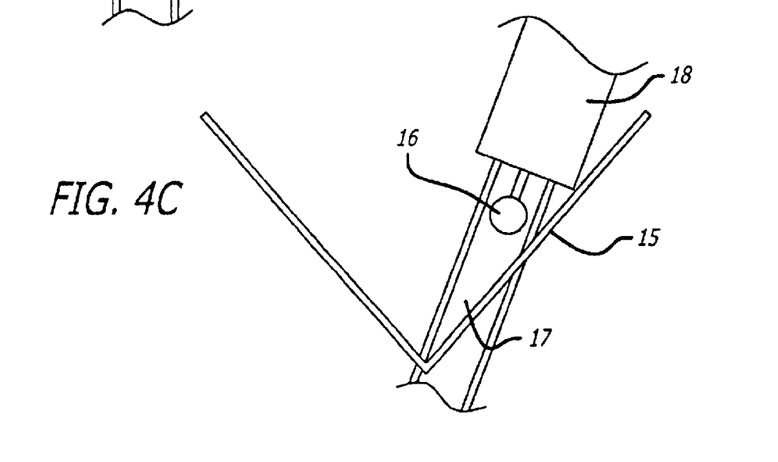
FIG. 4c is a plan view of the ram-bolt and V-mount system with a fully recessed ram-bolt while the draft vehicle turns to its right.
Figure 4D:
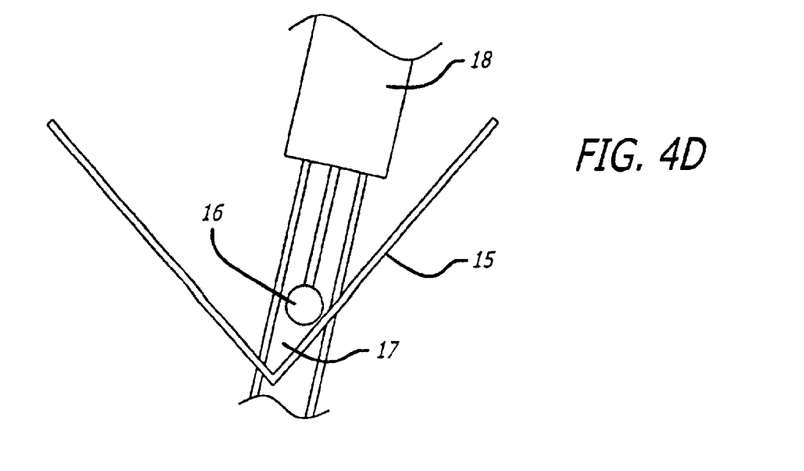
FIG. 4d is a plan view of the ram-bolt and V-mount system with a partially recessed ram-bolt.

Additionally, the front bar 14 of the frame 41 has a V-mount 15 narrowing down the length of the tongue 3 to near the pivot point 8 on the pivot-bar 9. A hydraulic cylinder 26 ram-bolt 16 rides a channel 17 on the top of the tongue 3 which may be pushed into or pulled out of the V-mount 15 to further control the articulation. At its most recessed point, see FIG. 4b, the tongue 3 pivots fully (contained only by the V-mount) in direct relationship to the turning of the draft vehicle. At its most extended point, the cylinder 18 is driven into the very 'bottom' of the V-mount 15 such that the trailer 1 becomes perfectly centered behind the draft vehicle and there is no articulation whatsoever (the trailers' wheels 10 are not allowed to turn away from center). As illustrated by FIG. 4d, points in-between may be selected for any degree of articulation as determined by the operator.

The limiting nature of the V-mount 15 touched on above, provides another benefit. With traditionally articulating trailers, the draft vehicle wheels can often interfere with the tongue of the trailer or the trailer itself on sharp turns. As illustrated by FIG. 4c, the invention's V-mount 15 prevents this from happening.

Alternatively, hydraulic cylinders (not shown) may attach from the tongue near its pivot point 8 to the box frame 41 of the trailer 1 such that the recess and extension of each may be controlled, thereby enabling the driver to steer the trailer 1. Recessing one cylinder while extending the other would rotate the tongue 3 against the box frame, 41 thereby turning the trailer's wheels 10. Like the V-mount system (described in the preceding paragraph and comprising the V-mount 15, ram-bolt 16, channel 17 ram-bolt cylinder 18), such hydraulic cylinders may be brought to a locked position where the trailer wheels 10 are locked at center.

Additionally, the wheel axles 19 may or may not be recessed back some distance from the back end of the frame 41 to allow for better high speed trailing; where, if left directly under their respective pivots, again the trailer 1 may swing back and forth at high speeds. Furthermore, the front stabilizer arm 7 (attached from tongue 3 to the draft vehicle) allows for better high speed trailing by controlling especially the twists of the trailer 1 against the towing draft vehicle on erratic terrain.

The trailer 1 has an attached standard three point (or 'link') implement tool bar hitch comprising of a top link 21 and two bottom links 24 mounted 20 on the rear of the box-frame 41. The top link 21 is connected to an adjustable arm 38, the other end of which travels along a rail 22. Its movement is controlled with a hydraulic cylinder 23 (but may be controlled by a winch or otherwise). This allows the top link 21 of the attached three point implement (not shown) to be raised and lowered independent of the bottom links 24; thereby allowing the operator to return the attached implement to the desired depth consistently; which is not as easily done with the standard three point hitch.

Figure 5A:
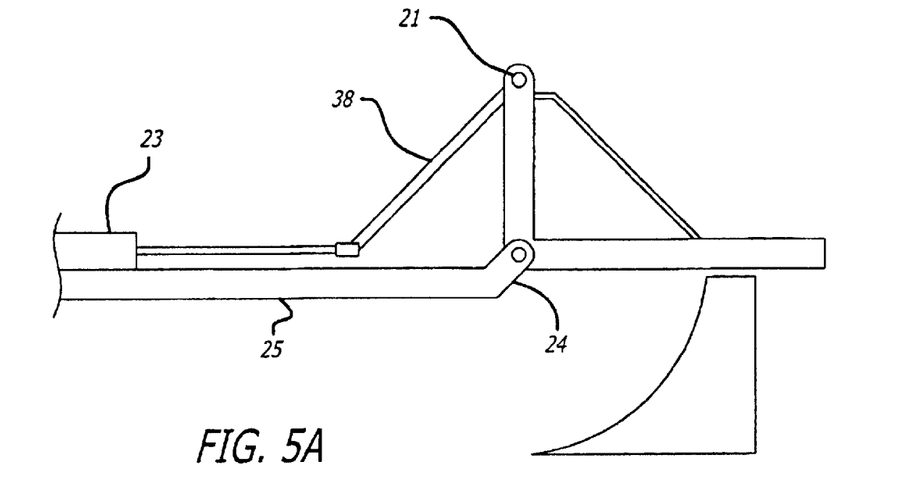
Figure 5B:
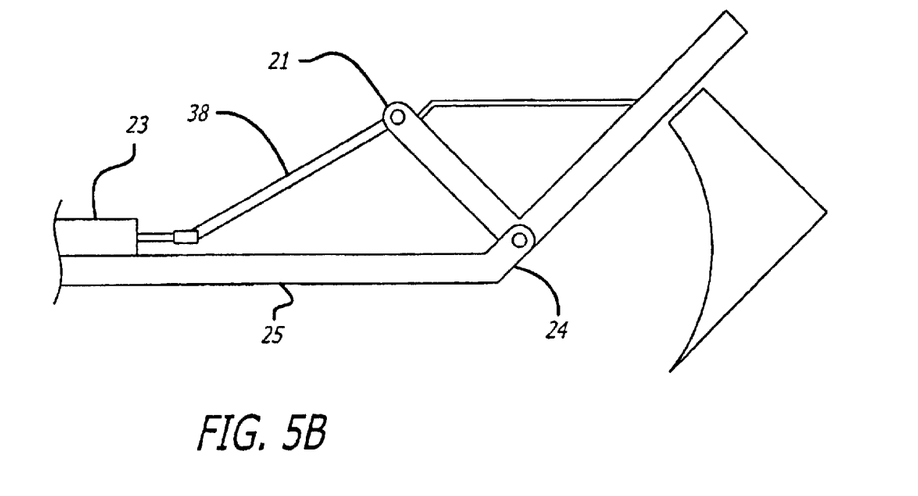

A significant advantage of traveling the top link 21 is that the load can then be rotated forward to bring the weight forward over the trailer wheels 10 as illustrated by FIG. 5b. With standard three point hitches as currently mounted on or towed behind ATV's, tractors and animal-drawn carts, there is no room to pull the top link in this way and the stationary top link attachment leaves the heavy weight of the load back behind the wheels. The traveling top link 21 allows for improved weight distribution pulling the top of the implement (as well as any carried load) over the trailer 1 itself rather than simply lifting it in the air. It enables a lighter, more mobile vehicle-combination to lift and move heavy objects such as heavy round hay bales, where previously small scale tractors, ATVs and animal-drawn forecarts had trouble doing so.

The bottom link 24 lift arms 25 pivot against a back spindle bridge 27 via hydraulic 28 or other manipulation connected to the fore 29 of the lift arms—thereby allowing the lifting and lowering of the bottom links 24. Cylinder 28 connects to a front spindle bridge 30 which rotationally connects to adjustable arms 31, in turn connected to the lift arms 25. It is contemplated that various cylinders 28 may be used with the present invention. The adjustable arms 31 may be shortened or lengthened to alter the height of the lift arms 25 relative to the ground (implements have varying attachment heights). Additionally, the lift arms 25 may travel laterally against the back spindle bridge 27 to accommodate varying tool bar widths and allow increased flexibility in maneuvering the attached implement.

A flatbed may be attached to the top of the trailer 1 which may be raised, lowered or dumped by operation of a hand or machine winch or a hydraulic cylinder. The flatbed may attach rigidly to the lift arms 25. It does not appear as if there is currently so efficient a coupling of three point hitch and flatbed capacity. While able to do both, the trailer remains relatively small, light and mobile.

In the back center area of the box frame 41 there may be a load carrying bed 34 to house or hold any type of motor or battery, for example, a 12 volt DC hydraulic power unit 35, which may drive operations on the trailer or off. Also, a swiveling mount 36 may be used to hold the hydraulic power unit push button controls 42.

A jack-stand 37 may be rotationally connected to the frame 41 at any point to hold the front of the trailer 1 at varying heights when not connected to a draft vehicle.

The synchronized steering design together with the controlled-articulation and the general size, allow for increased stability when trailing a work vehicle and especially when handling heavy loads. The traveling nature of the three point hitch's' top-link 21 allows the trailer 1 to lift and carry heavier loads than those possible under current trailer or attachment designs for use with ATVs, small scale tractors, or animal-drawn carts.

It will be understood that this disclosure, in many respects, is only illustrative. Changes may be made in details, particularly in matters of shape, size, material and arrangement of parts without exceeding the scope of the invention. Accordingly, the scope of the invention is as defined in the language of the appended claims.

What is claimed is:

1. A connection mechanism useable to connect a trailer articulation device to a pulling vehicle comprising:
   a hitch plate fixedly attachable to a pulling vehicle;
   a tongue having:
      a forward end pivotally connectable to the hitch plate;
      a rearward end operably connectable to wheels of a trailer articulation device such that angular movement by the tongue relative to the trailer articulation device causes the wheels to pivot about vertical axes; and,
      a mid-point between the forward end and the rearward end;
   a coupler pivotally connecting the mid-point of the tongue to the trailer articulation device; and,
   a stabilizing arm operably attached to the hitch plate and the tongue for preventing angular movement therebetween.

2. The connection mechanism of claim 1 wherein the stabilizing arm comprises a fixedly adjustable length thereby allowing the tongue to be angularly adjusted relative to the hitch plate.

3. The connection mechanism of claim 1 wherein the forward end of the tongue comprises a female coupling.

4. The connection mechanism of claim 1 wherein the hitch plate comprises at least one riser, capable of receiving saddle weights.

5. The connection mechanism of claim 1 wherein the hitch plate defines mounting holes aligned with holes on the pulling vehicle useable to removably yet fixedly attach the hitch plate to the pulling vehicle.

6. A connection mechanism useable to connect a trailer articulation device to a pulling vehicle comprising:
   a first means for imparting forward movement of a pulling vehicle to a trailer articulation device having wheels;
   a second means for connecting the first means to the pulling vehicle;
   a third means for preventing angular movement of the first means relative to the pulling vehicle;
   a fourth means for causing angular movement of the first means relative to the trailer articulation device to result in a pivoting of the wheels around vertical axes.

7. The connection mechanism of claim 6 wherein the first means comprises a hitch plate fixedly attachable to the pulling vehicle.

8. The connection mechanism of claim 6 wherein the first means comprises a fifth means for carrying weights.

9. The connection mechanism of claim 8 wherein the fifth means comprises at least one riser.

10. The connection mechanism of claim 6 wherein the second means comprises a tongue.

11. The connection mechanism of claim 6 wherein the third means comprises a stabilizing arm operably attached between the first means and the second means.

12. The connection mechanism of claim 11 wherein the third means comprises a stabilizing arm of adjustable length operably attached between the first means and the second means.

13. The connection mechanism of claim 6 wherein the first means comprises a tongue and the fourth means comprises a coupler pivotally attaching the tongue to the trailer articulation device at a midpoint along the tongue such that a trailing end of the tongue swings laterally relative to the trailer articulation device when the tongue moves angularly relative to the trailer articulation device, the trailing end of the tongue operably connected to the wheels such that the lateral swinging motion causes the wheels to pivot around vertical axes.

14. The connection mechanism of claim 6 wherein the third means is adjustable, thereby allowing an angle between the first means and the second means to be selected and fixed.

* * * * *